United States Patent [19]

Elwell et al.

[11] Patent Number: 5,704,678
[45] Date of Patent: Jan. 6, 1998

[54] CAP PROTECTOR FOR PICKUP TRUCK SIDEWALLS

[75] Inventors: Dennis L. Elwell, Ankeny; Robert L. Sills, Story City, both of Iowa

[73] Assignee: Putco Incorporated, Story City, Iowa

[21] Appl. No.: 644,944

[22] Filed: May 13, 1996

[51] Int. Cl.$^6$ .................................................. B60R 13/04
[52] U.S. Cl. .................... 296/39.2; 296/41; 296/32; 280/770
[58] Field of Search .......................... 296/39.2, 41, 32; 280/770; 410/106, 108, 109, 112

[56] References Cited

U.S. PATENT DOCUMENTS

| | | | |
|---|---|---|---|
| 4,604,013 | 8/1986 | Elwell et al. | 296/41 |
| 4,818,006 | 4/1989 | Arndt | 296/41 |
| 4,909,559 | 3/1990 | Zettle | 296/41 |
| 5,364,211 | 11/1994 | Lund | 410/108 |

FOREIGN PATENT DOCUMENTS 1078430  5/1980  Canada ................. 280/770

*Primary Examiner*—Gary C. Hoge
*Attorney, Agent, or Firm*—Zarley,McKee,Thomte, Voorhees,& Sease

[57] ABSTRACT

A protective cap for covering the sidewalls of a pickup truck bed is provided. The caps have a contour matching the contour of the sidewalls so as to provide a close fit, without the use of spacers or shims. The cap includes an elongated body with opposite forward and rearward ends and opposite inside and outside edges. Inside and outside lips are formed by bending portions of the respective inside and outside edges of the body downwardly. A notch is provided adjacent the rearward end of the body, to permit a rearward lip to be formed by bending a portion of the rearward end downwardly. The formation of the outside and rear lips closes the gap. The outside lip and rear lip are joined by a weld which fills the closed notch so as provide a continuous curved surface at the rearward corner of the body. The weld is polished to be visually indistinguishable from the outside and rear lips. When the cap is mounted upon a sidewall of the truck, the outside and rear lips overlappingly mate with the curved rearward end of the sidewall.

15 Claims, 3 Drawing Sheets

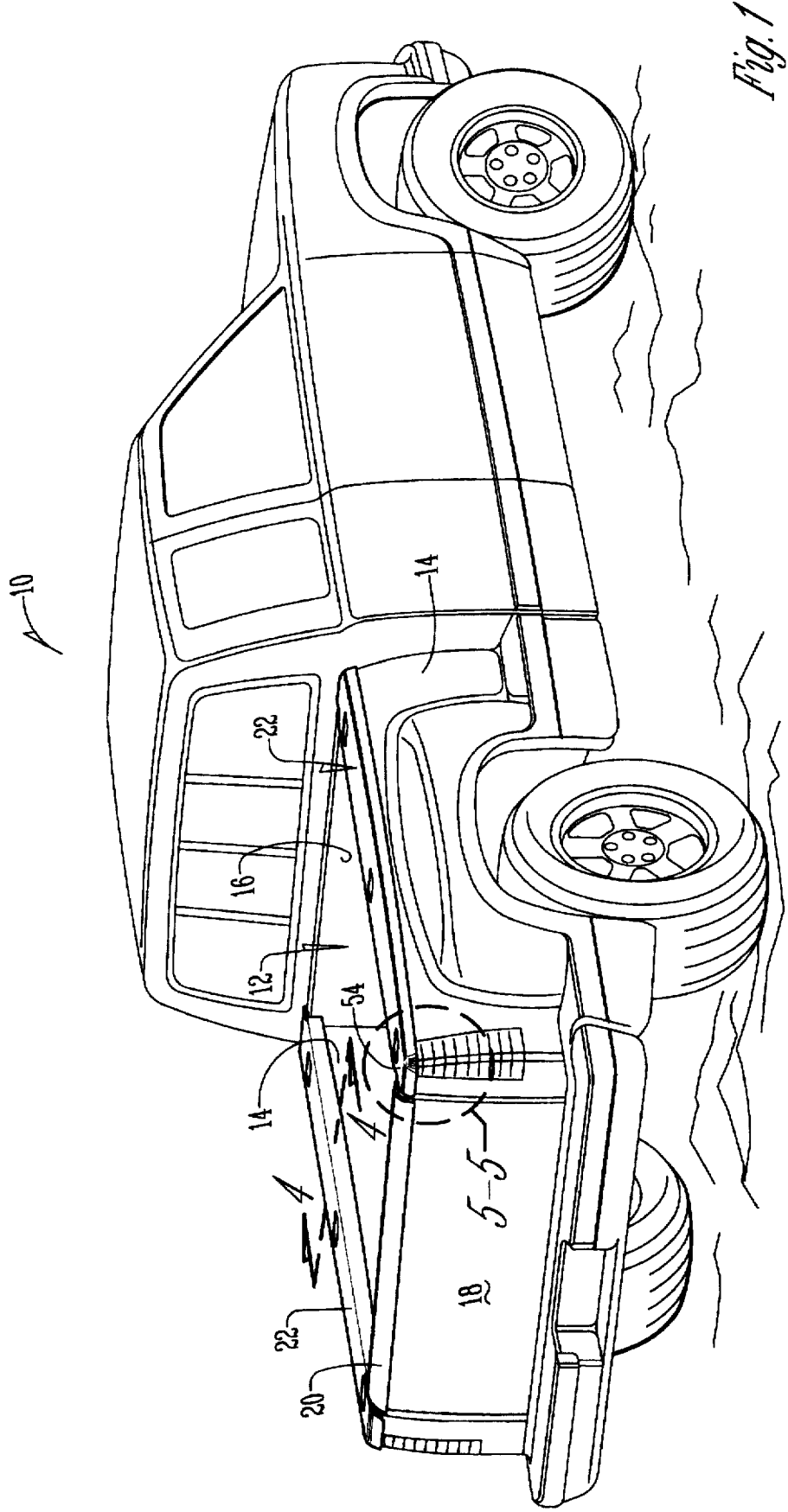

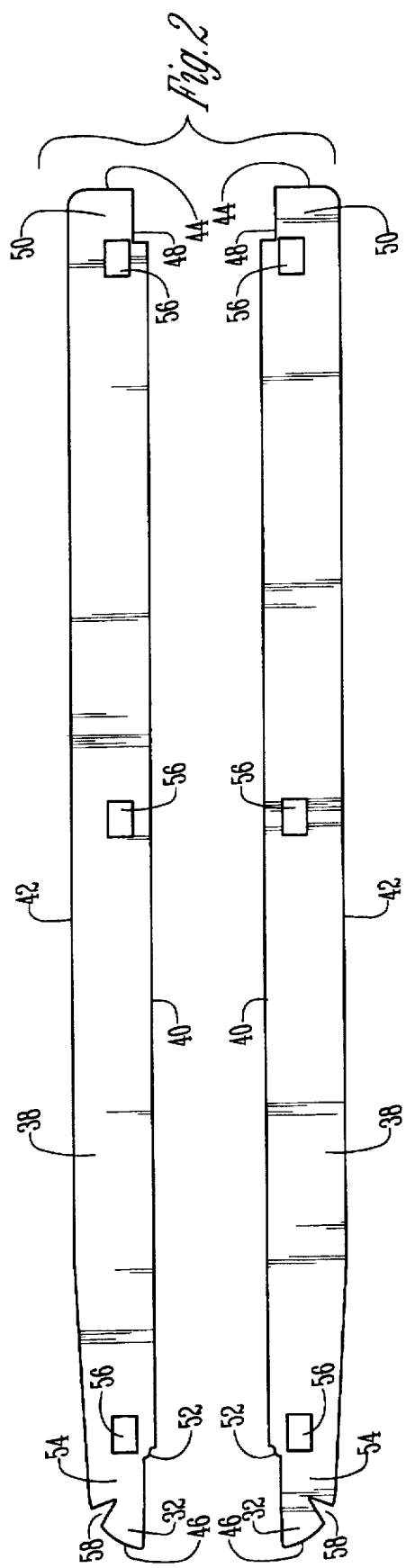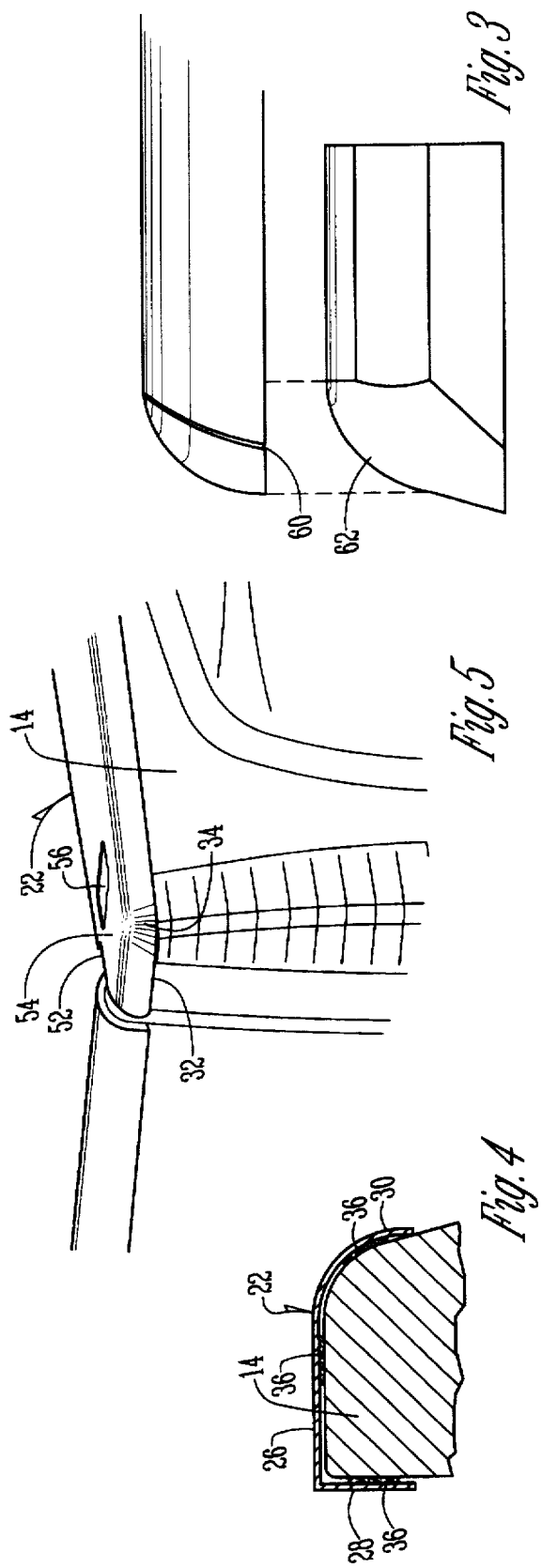

CAP PROTECTOR FOR PICKUP TRUCK SIDEWALLS

BACKGROUND OF THE INVENTION

Protective and decorative caps are popular after-market accessories for covering the sidewalls of the bed and the tailgate of pickup trucks. Such caps are made from metal or plastic. Conventional metal sidewall caps have been made with straight-line tooling, which fails to provide a contoured shape to fit the new aerodynamic curves and slopes of the sidewalls provided on newer model trucks. Such conventional metal caps use spacers or shims between the inside lip of the cap and the interior surface of the sidewall to pull the outside lip of the cap into engagement with the contoured outside surface of the sidewalls of the truck bed. These prior art metal caps also do not cover and protect the curved rearward ends of the sidewalls, since such caps can not be formed with existing straight-line tooling. Thus, most prior art metal bed caps stop short of the curved rearward end of the sidewall adjacent the tailgate. Other prior art sidewall caps provide a horizontal extension or tab to cover the upper surface of the rearward end of the sidewall, but still fail to extend around the vertical rearward end of the sidewall. Still other prior art bed caps have a short curved lip at the rearward end which would extend a short distance over the rear radiused end of the sidewall, but such curved lip include wrinkles from formation and do not extend sufficiently downward to match or align with a tailgate protective cap.

Accordingly, a primary objective of the present invention is the provision of an improved protective cap for the sidewalls of a pickup truck bed.

Another objective of the present invention is the provision of a method for manufacturing an improved metal protective cap for the sidewalls of a pickup truck bed.

Another objective of the present invention is the provision of a metal cap for the sidewalls of a truck which includes a rearward end adapted to cover the radiused rearward end of the sidewall.

A further objective of the present invention is the provision of a protective cap for truck sidewalls which is contoured to matingly fit the contoured sidewall of a pickup truck.

Still another objective of the present invention is the provision of a metal cap for protecting the sidewalls of a pickup truck and having a smoothly finished curved rearward end which is free from wrinkles.

Another objective of the present invention is the provision of a sidewall cap for a pickup truck which closely fits over the inner and outer surfaces of the sidewall without the use of spacers or shims.

A further objective of the present invention is the provision of a pickup truck sidewall cap having downwardly extending outside and rear lips with a visually indistinguishable weld therebetween.

Another objective of the present invention is the provision of a method of manufacturing a metal cap for protecting the sidewall of a pickup truck bed, the method utilizing a heat dissipating mandrel during welding to prevent warpage of the cap.

Still another objective of the present invention is a method of manufacturing a cap for the sidewalls of a truck using model specific tooling such that the cap is contoured to closely match the sidewalls of a specific truck model.

These and other objectives will become apparent from the following description of the invention.

SUMMARY OF THE INVENTION

The truck sidewall cap of the present invention includes an elongated body having a forward end, a rearward end, and opposite sides. The body includes a top portion with inside and outside lips extending downwardly therefrom. The rearward end of the body includes a downwardly extending rear lip which is joined with the outside lip by welding to form a smooth curved surface. The weld is ground, polished and buffed so as to provide a smooth finish which is visually indistinguishable from the surfaces of the outside and rear lips. The cap is contoured so as to matingly cover the sidewall of the truck, with the curved surface at the rearward end being adapted to cover the radiused rear end of the sidewall. An adhesive material is provided on the interior of the cap to mount the cap to the sidewall.

The method of making the protective cap in accordance with the present invention includes the steps of cutting a blank from a piece of sheet metal, with a notch at the rear outside corner of the blank. The inside, outside and rear edges of the blank are then bent downwardly so as to form the inside, outside and rear lips, respectively. The notch between the outside and rear lips is filled with a weld so as to provide a continuous surface between the outside and rear lips. The weld is made by placing the rearward end of the cap over a mandrel so as to dissipate the heat of the welding operation from the lips, and thereby prevent warpage of the cap. The blank cutting and lip forming steps are performed with model specific tooling so that the resulting cap will have a contour which matingly fits with the aerodynamic designs of the sidewalls of specific truck models.

BRIEF DESCRIPTION OF THE DRAWINGS

FIG. 1 is a perspective view of a pickup truck having the sidewall protective caps of the present invention.

FIG. 2 is a top plan view of the left hand and right hand cap blanks, prior to formation of the downwardly extending lips.

FIG. 3 is a partial side elevation view showing the rearward end of the right hand end cap prior to welding, and showing the mandrel upon which the end cap is welded.

FIG. 4 is a sectional view of the end cap taken along lines 4—4 of FIG. 1.

FIG. 5 is an enlarged perspective view taken along lines 5—5 of FIG. 1 showing the rear corner of the cap mounted on the truck sidewall.

DETAILED DESCRIPTION OF THE DRAWINGS

Figure 6:
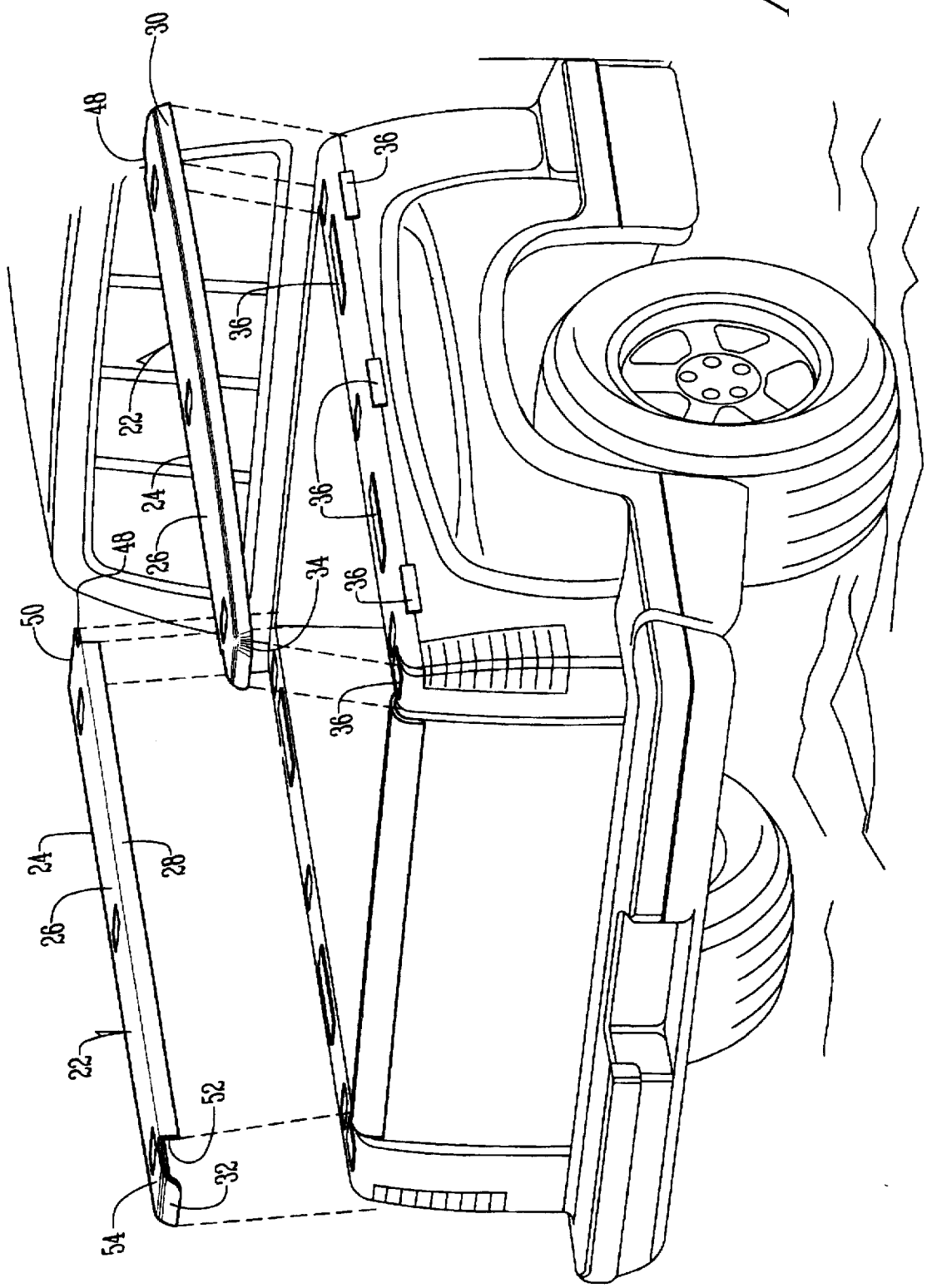
FIG. 6 is an exploded perspective view similar to FIG. 1.

With reference to the drawings, a pickup truck is generally designated by the reference numeral 10, and includes a bed 12 with left and right sidewalls 14, a front wall 16, and a tailgate 18. The tailgate 18 is shown to have a protective cap 20, which is not a part of the present invention.

The present invention is directed towards a protective cap 22 which is adapted to matingly fit over each sidewall 14 of the truck bed 12. Since the left hand and right hand caps are mirror images of one another, the same reference numerals will be utilized for the cap of each sidewall.

As best seen in FIGS. 1 and 4, each cap 22 includes an elongated body having a horizontally disposed top portion 26, a downwardly extending inside lip 28, a downwardly extending lip 30, and a downwardly extending rear lip 32. The inside lip 28 normally will be linear or straight, whereas the outside lip 30 will be curved or tapered in accordance with the shape of the sidewall 14. As seen in FIGS. 1 and 5, the outside lip 30 and the rear lip 32 form a smooth continuously curved surface 34 on the rear corner of the cap 22. The formation of the curved surface 34 will be discussed in further detail below.

The cap 22 is contoured in various forms, with each form being specifically designed to precisely match the sidewall contour of a specific truck model. For example, the profile and contour of the caps for Chevy, Dodge and Ford pickups will each be slightly different, and will be different for each truck model of each manufacturer.

The cap 22 is preferably mounted upon the sidewall 14 using double stick adhesive tape. The use of adhesives avoids the need to drill into the sidewall for mounting with bolts or screws. In FIG. 5, the tape 36 is shown on the sidewall 14 of the truck, however, the tape 36 will normally be provided on the interior surface of the cap 22, which is then adhered to the sidewall 14.

The manufacturer of the protective caps 22 is a multistep process. First, a blank 38 is cut or punched from sheet metal stock. Examples of preferred stock include 18 ga. 304 stainless steel that will not rust or stain; 0.063 inch thick 3003 Tread Bright aluminum; and 18 ga. cold rolled steel, black powder coated.

The blank 38 has an outline or profile which is specifically designed for each specific truck model. The blank 38 includes an inside edge 40, and outside edge 42, a forward end 44, and a rearward end 46. As seen in FIG. 2, the inside edge 40 is straight, whereas the outside edge 42 is tapered adjacent the rearward end 46. The blank includes a front notch 48 which accommodates the front wall 16 of the bed 12. A front tab 50 extends to the forward edge of the sidewall 14, adjacent the front wall 16. A rear notch 52 accommodates the tailgate 18, in conjunction with a horizontally disposed rear tab 54 which covers the top surface of the rear end of the sidewall 14 adjacent the tailgate 18. A plurality of stake holes 56 may be punched or formed in the blank 38, and are adapted to align with the stake holes in the sidewalls 14 of the bed 12.

After the blank 38 is cut, the lips 28, 30 and 32 are formed with model specific tooling. More particularly, the inside lip 28 is formed by bending the inside edge 40 of the blank 38 downwardly with a press brake. Similarly, the outside lip 30 is formed by bending the outside edge 42 downwardly. As best seen in FIG. 4, the inside lip 28 is formed with a small diameter radius and extends approximately 90° from the top portion 26 of the cap 22. The radius between the top portion 26 and the outside lip 30 is a relatively large diameter.

The blank 38 includes a notch 58 adjacent the rear outside corner. The notch 58 defines the rear lip 32, which is bent downwardly from the rear tab 54 with a large radius transition therebetween. The downward bending of the outside lip 30 and the rear lip 32 substantially closes the notch 58, thereby defining a small space or gap 60, as seen in FIG. 3.

The manufacturer process for the cap 22 continues by providing a TIG weld which closes the gap 60. The welding is performed with a mandrel 62 inserted into the rearward end of the cap. The mandrel 62 has an exterior surface corresponding to the curvature and contour of the rearward end of the cap 22. The mandrel 62 serves to dissipate heat from the welding process away from the cap 22, thereby preventing warpage of the cap. Preferably, the mandrel 62 is made of brass or other heat conductive materials.

The weld is ground, polished and buffed so as to provide the smooth continuous curved corner 34. The weld is indistinguishable from the outside lip 30 and rear lip 32. The exterior surface of the cap 22 is given a final buff so as to fully blend the finish, and thereby hide or disguise the weld from visual observation.

When the cap 22 is mounted on the sidewall 14 of the truck bed 12, the curved rearward end of the cap closely matches and matingly fits over the radiused rear end of the sidewall 14, as seen in FIG. 1. The rear lip 32 extends downwardly to a level substantially even with the lower edge of the tailgate cap 20, to provide a substantially continuous line at the bottom edge of the caps 20 and 22. Also, since the contour of the caps 22 match the contour of the sidewalls 14, no spacers or shims are necessary. Thus, an attractive and well-fitting protective cap is provided for the sidewalls 14 of the truck 10.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A truck sidewall cap for protecting the sidewall of a pickup truck, comprising:

an elongated body having a forward end, a rearward end, a top portion, an inside lip extending downwardly from the top portion, and an outside lip extending downwardly from the top potion;

a rear lip extending downwardly from the rearward end of the body;

the rear lip and the outside lip being joined to form a smooth curved surface;

the cap being contoured to matingly cover the sidewall of the truck, with the curved surface being adapted to cover a radiused rear end of the sidewall.

2. The cap of claim 1 wherein the rear and outside lips are joined by a weld.

3. The cap of claim 1 wherein the body is tapered adjacent the rearward end.

4. The cap of claim 1 wherein the body is constructed of metal.

5. The cap of claim 1 wherein the body is free from wrinkles.

6. The cap of claim 1 wherein the body has opposite interior and exterior surfaces, and further comprising adhesive material on the inside surface for mounting the cap to the sidewall.

7. The cap of claim 1 wherein the body is formed with a notch between the outside lip and rear lip, the notch being filled with a weld to join the outside and rear lips.

8. The cap of claim 1 further comprising at least one hole in the top portion, the hole being located so as to align with a stake hole in the sidewall of the truck.

9. A protective cap for covering a sidewall of a pickup truck bed, comprising:

an elongated body having opposite forward and rearward ends, opposite inside and outside edges, and a notch at the rearward end of the outside edge;

an inside lip formed by bending a portion of the inside edge downwardly;

an outside lip formed by bending a portion of the outside edge downwardly;

a rear lip formed by bending a portion of the rear end downwardly;

the notch being narrowed by the formation of the outside and rear lips;

a weld filling the notch to provide a continuous curved surface at the rearward end of the body to matingly cover a curved rearward end of the sidewall of the truck bed.

10. The cap of claim 9 wherein the weld is polished so as to be visually indistinguishable.

11. The cap of claim 9 further comprising a stake hole in the body adapted to align with a stake hole in the sidewall.

12. The cap of claim 9 wherein the weld is made over a heat dissipating mandrel to prevent warpage of the cap.

13. The cap of claim 9 wherein the rearward end of the body is tapered.

14. The cap of claim 9 wherein the body has opposite interior and exterior surfaces, and further comprising adhesive material on the inside surface for mounting the cap to the sidewall.

15. The cap of claim 9 wherein the body and lips have a custom contour to matingly fit a specific truck model without the use of spacers.

* * * * *